United States Patent [19]

Craddock et al.

[11] 4,232,579
[45] Nov. 11, 1980

[54] SWITCH ACTUATING ASSEMBLY FOR POWER TOOLS

[75] Inventors: Peter J. Craddock, Oldham; Brian R. Law, Leicester; Albert J. Smith, Nuneaton, all of England

[73] Assignee: Burgess Power Tools Limited, Great Britain

[21] Appl. No.: 8,109

[22] Filed: Jan. 31, 1979

[51] Int. Cl.$^3$ .................. B26D 5/00; B27B 13/00; B27G 19/06
[52] U.S. Cl. ............................ 83/788; 83/701; 83/859; 83/DIG. 1; 200/334
[58] Field of Search .................. 200/153 T, 330, 332, 200/334; 83/788, 859, 860, 701, DIG. 1

[56] References Cited
U.S. PATENT DOCUMENTS 3,081,390  3/1963  Lasar ............................ 200/334 X

FOREIGN PATENT DOCUMENTS 1054007  1/1967  United Kingdom .

Primary Examiner—J. M. Meister
Attorney, Agent, or Firm—Charles W. Helzer

[57] ABSTRACT

A power tool, such as for example a bandsaw, incorporates a synthetic material moulding which is box shaped and mounts on the rear an electric motor and its housing, and on the front inside the box an implement drive mechanism such as a pulley in the case of the bandsaw. One side of the moulding mounts a switch actuating assembly substantially flush with the side by way of an OFF actuating plate pivotably received in a recess in the side and an ON actuating plate underneath the OFF actuating plate. In a preferred embodiment the opposite side to the one carrying the switch actuating assembly is adapted to rigidly support a structural metal spine member.

7 Claims, 17 Drawing Figures

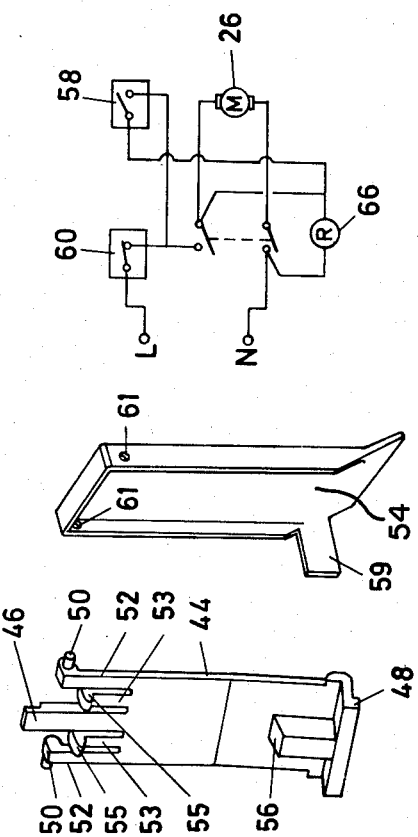

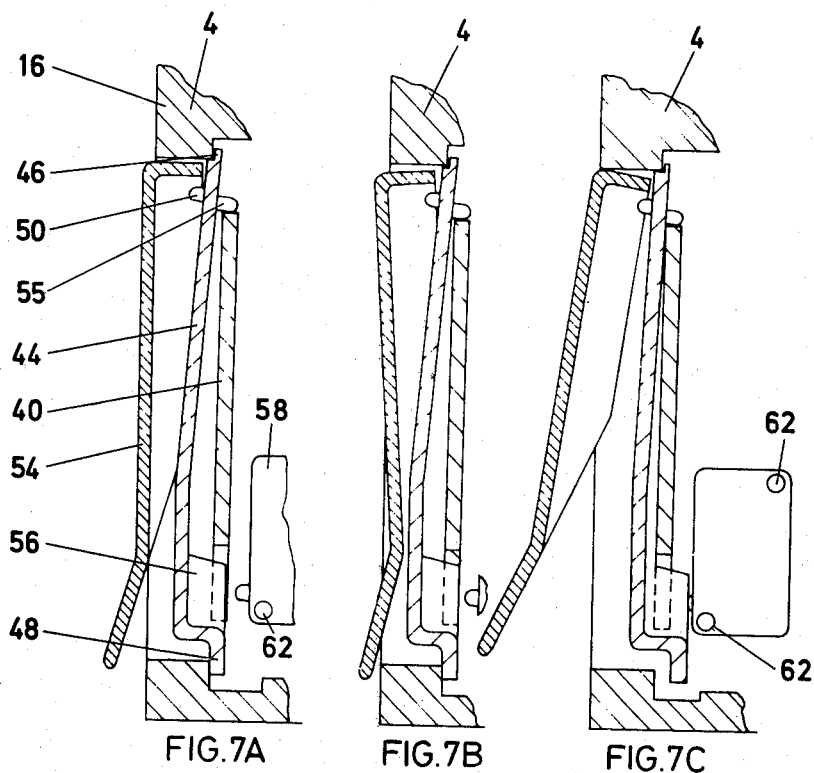

SWITCH ACTUATING ASSEMBLY FOR POWER TOOLS

FIELD OF INVENTION

The invention relates to power tools and particularly bandsaws.

BACKGROUND

Power tools have been produced from metal castings. Bandsaws are known for example where the casting mounts drive, implement and support components and have attached thereto a control switch. The cost of production is high and the control switches used can be accidentally operated in an incorrect manner. The casting can not be integrated easily with the other components in an esthetic compact manner without appreciable costs. The castings used are suited only for a single type of tool.

It is the object of the invention to provide power tools improved in any one or more of the above aspects.

SUMMARY OF THE INVENTION

The invention utilises a box shaped moulding of a synthetic material as a mounting for other power tool components. A switch actuating assembly in the form of a pair of superimposed actuating plates are fitted onto one side of the moulding substantially flush with the surface. Thus an esthetically pleasing yet simple and safe switch actuating arrangement can be provided. Suitably a side of the moulding opposite to the aforementioned side is arranged to rigidly support a structural spine member for the firm attachment of such other power tool components as may be desired.

DRAWINGS

FIG. 5 is a perspective view of an ON-switch actuating plate;

FIG. 6 is a perspective view of an OFF-switch actuating plate;

Figure 1A:
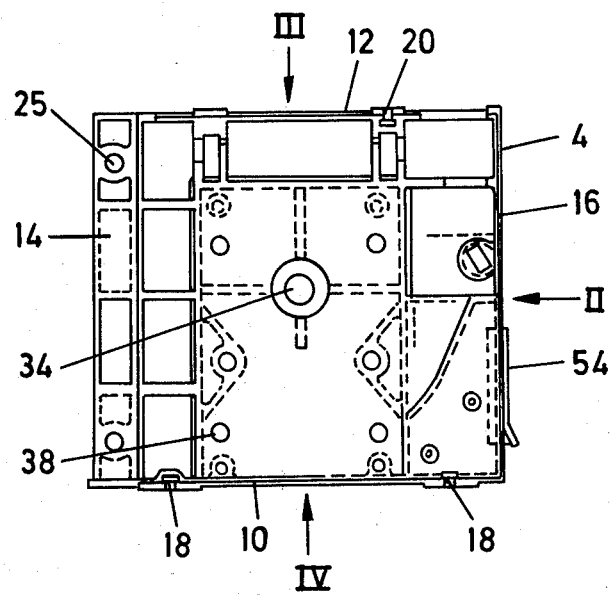
FIG. 1A is a front view of a moulding carrying switch actuating plates of a bandsaw according to the invention.
Figure 1B:
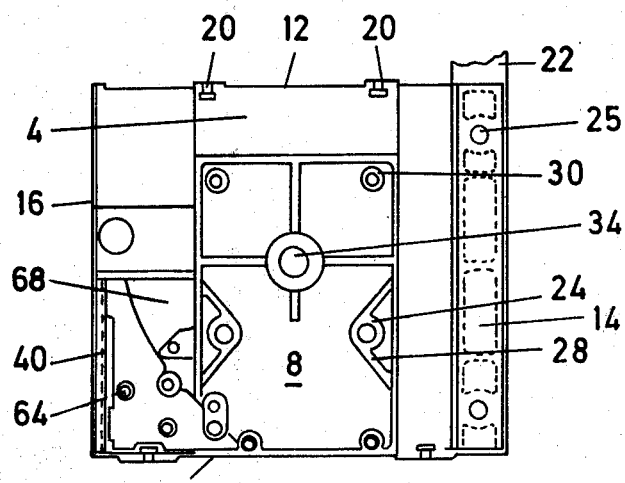
FIG. 1B is a rear view of the moulding of FIG. 1A.
Figure 2:
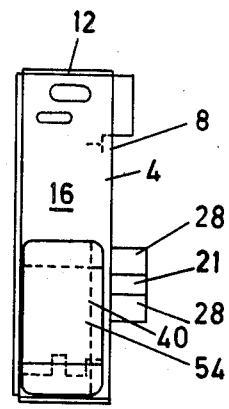
FIG. 2 is a view in the direction of arrow II in FIG. 1.
Figure 3:
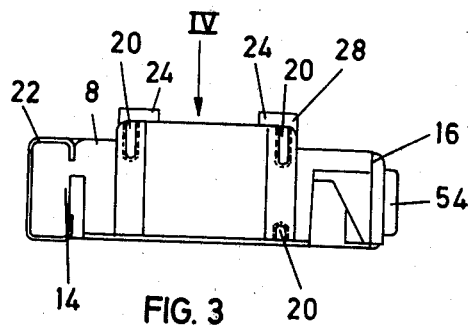
FIG. 3 is a view in the direction of arrow III in FIG. 1.
Figure 4:
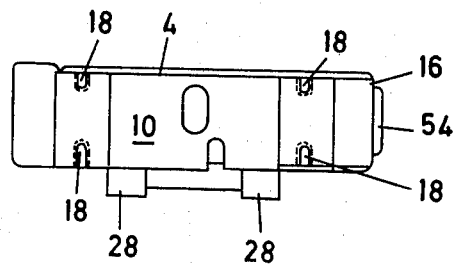
FIG. 4 is a view in the direction of arrow IV in FIG. 1.
Figure 9:
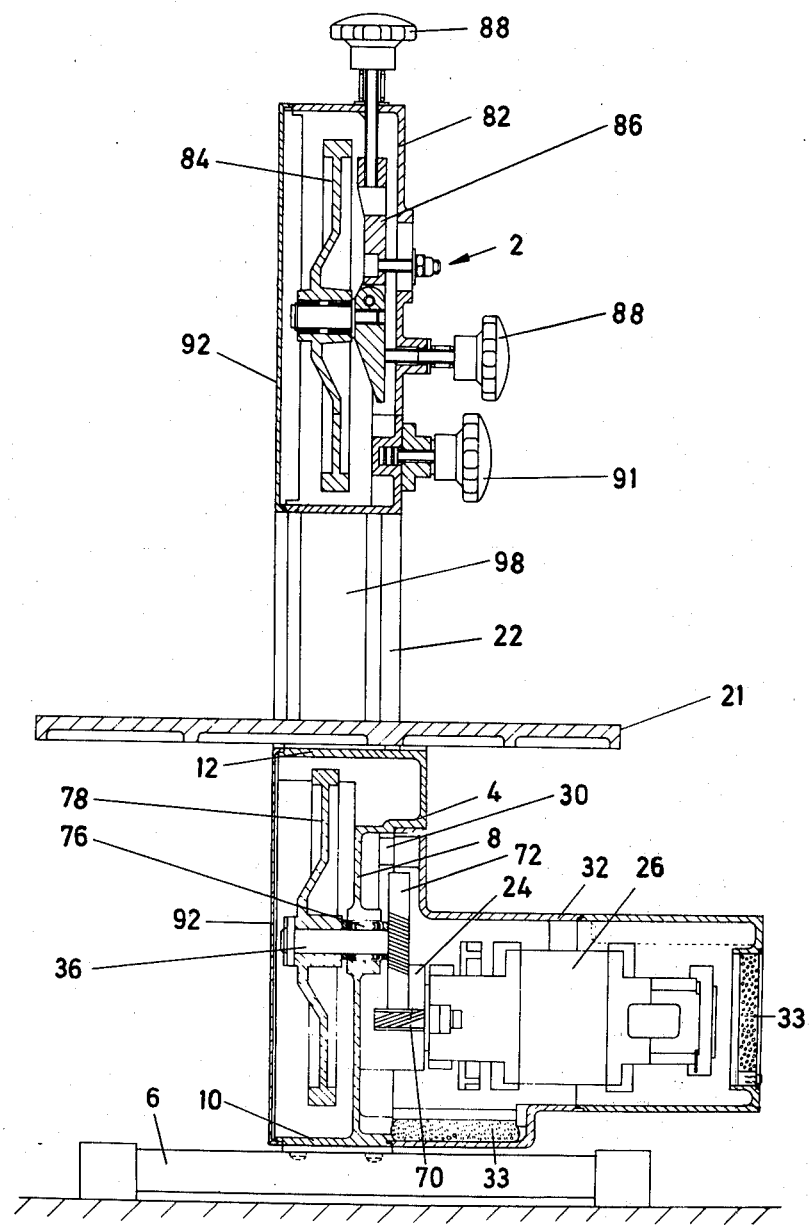
Figure 10:
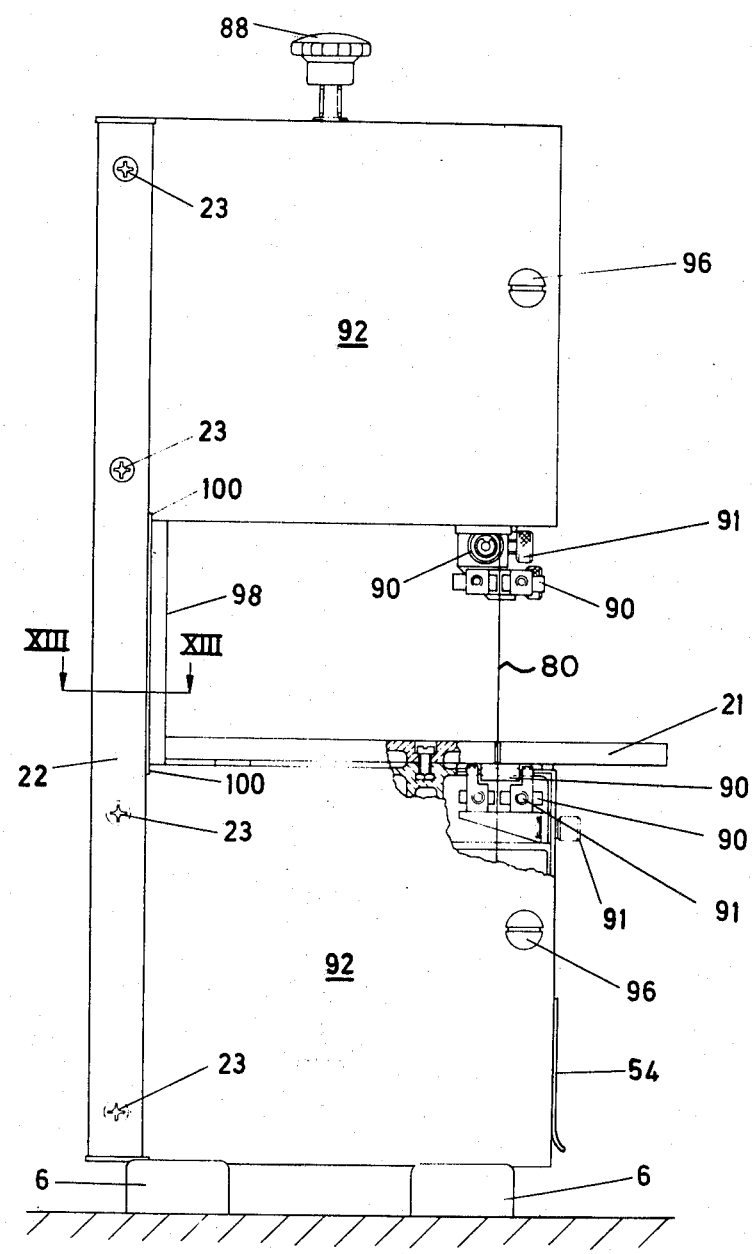
Figure 11:
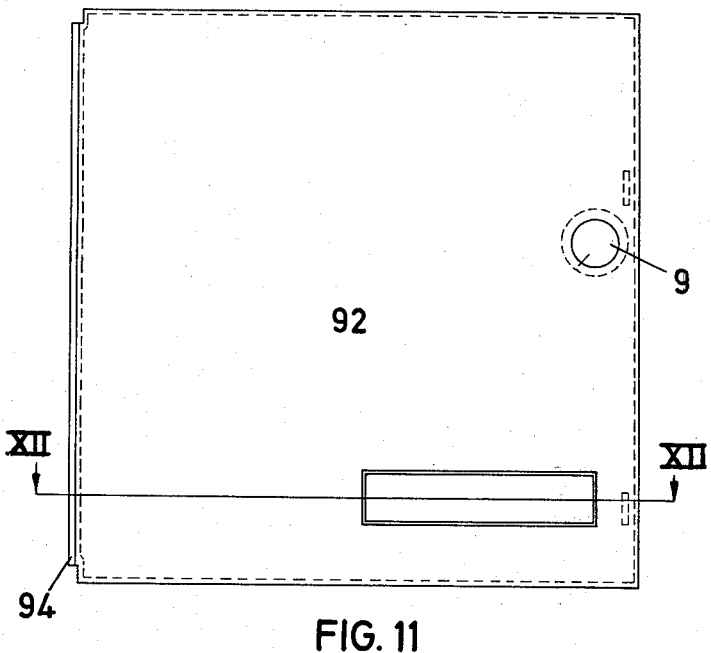
Figure 12:
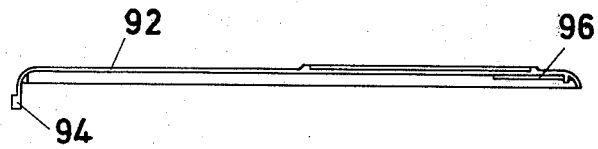
Figure 13:
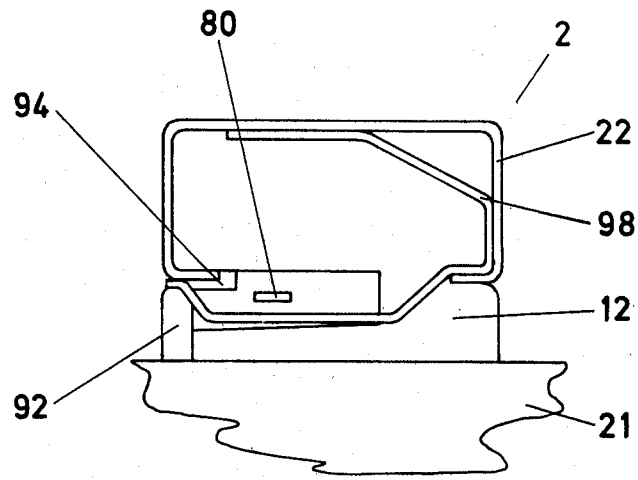

FIGS. 7A to C show different modes of the switch actuating plates of FIGS. 5 and 6 when mounted in the moulding of FIGS. 1 to 4;

FIG. 8 shows a schematic control circuit of the bandsaw of the invention actuated by the plates of FIGS. 5 and 6;

FIG. 9 show a section through an assembled bandsaw of the invention including the moulding of FIG. 1;

FIG. 10 shows a front view of the bandsaw of FIG. 9;

FIG. 11 shows a front view of a lid for the moulding of FIG. 1;

FIG. 12 shows a section along line XII—XII in FIG. 11;

FIG. 13 shows a section along line XIII—XIII in FIG. 10; and

Figure 14:
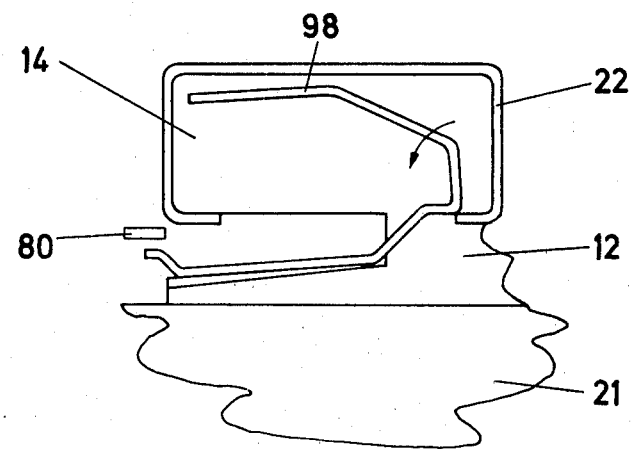

FIG. 14 shows a view similar to FIG. 13 but with the components in a different mode for the removal of a bandsaw blade.

DESCRIPTION OF PREFERRED EMBODIMENTS

A power tool such as a bandsaw 2 (see FIGS. 9 and 10) includes a moulding 4 supported by support legs 6. The moulding 4 has (see FIGS. 1A to 4) an open box shape formed by a rear wall 8 and sides 10, 12, 14, 16.

The side 10 has slots 18 for fastening the legs 6 or any alternative support means. The side 12 has slots 20 for fastening a work top 21. The side 14 has a column portion for locating inside a U-section metal spine member 22 shown in FIG. 1B and 3. The spine member 22 is fastened in position by screws 23 passing through openings 25 in the mouling 4 as shown in FIG. 10.

The rear wall 8 has on its rear face mountings 24 for bolts for securing an electric motor 26, which mountings are strongly supported by webs 28. The rear wall has also mountings 30 for fastening a motor housing 32 (See FIG. 9). The housing 32 is equipped with filters 33 for air into and out of the housing 32. An aperture 34 for a drive shaft 36 extends through the wall 8. Mountings 38 are provided on the front face of the wall 8 for supporting a drive conversion mechanism (not shown) if required.

On the remaining side 16, the moulding 4 is formed with apertures and an inwardly offset side portion 40 to support a switching plate assembly 42 substantially flush with the side 16 and opposite the spine member 22. The assembly 42 comprises an ON actuating plate 44 (see FIGS. 5 to 7) which has projecting edges 46 and 48 for projecting through the side 16 for clipping the assembly in position, sideways projecting pins 50 on resilient projections 52 for clipping into holes 61 on an OFF actuating plate 54, lugs 55 on projections 57 and a rib 56 for engaging an ON microswitch 58. The assembly further includes the OFF actuating plate 54 which has a projection 59 for engaging an OFF microswitch 60 and is hinged on the pins 50. The microswitches are Type V4T8 made by Burgess Microswitch Limited.

The microswitches 58 and 60 are both mounted on pins 62 fastened into mountings 64 in the wall 8 and operate (See FIG. 8) the motor 26 through a relay 66 which is retained at 68 on the wall 8. The spring force for operating the microswitch 60 is smaller than that for operating the microswitch 58.

As shown in FIG. 9, when the motor is switched ON, the motor output helical gear 70 drives a worm gear 72 on the shaft 36 mounted on bearings 76 in the aperture 34. In the case of a bandsaw the shaft 36 mounts a nylon pulley 78 inside the moulding 4 for moving a bandsaw blade 80 (FIGS. 10, 13 and 14) and the spine member 22 mounts another moulding 82 for another nylon pulley 84. The pulley 84 has a mounting 86 where attitude can be adjusted by knobs 88 whilst guides 90 for the bandsaw blade 80 in the mouldings 4 and 82 can be adjusted in a known manner by knobs 91 (see FIG. 10). The front of the mouldings 4 and 82 can be closed by lids 92 (see FIGS. 11 and 12) which have a lip 94 for locating behind the inturned edge of the spine member 22 and turn and twist closure member 96 for cooperating with a suitably equipped part of the mouldings. To avoid inadvertent mishaps, a guide 98 for the return side of the bandsaw blade 80 is clipped inside the spine member 22 as shown in FIGS. 13 and 14, the guard having upper and lower extensions 100 (see FIG. 10) for locating behind the lids 92 so that the guard 98 is blocked into place.

ASSEMBLY OF BANDSAW

Using the moulding 4, the support legs 6, the motor 26, the housing 32, the spine member 22 and the work top 21 can be attached quickly and conveniently. The assembly 42 is put together by bending the projections 52 towards one another and releasing the pins 50 into the corresponding apertures in the OFF actuating plate 54. The assembly 42 can then be clipped onto the moulding by bending the edges 46 and 48 towards one another and releasing them behind the side 16 with the lugs 55 resting on the top of the side portion 40. The guard 98 can be slid down the spine member 22. The operative drive and guide components of the bandsaw can then be attached. Finally each lid 92 can be secured by operating a single closure 96. The resulting bandsaw has a clean appearance and has a rigid frame formed by the moulding 4 and 42 and the metal spine member 22 interconnecting them.

Other power tools may be provided utilizing the same or similar mouldings 4, the support legs 6, the motor 26, the housing 32 and the assembly 42. A fret saw can be provided by attaching a rotary-reciprocatory motion conversion device to the shaft 36 using the mountings 38. A similar lid and work top may be used. A polishing unit may be provided by supporting a polishing wheel shaft using the mountings and projecting it through a hole in a cover otherwise similar to the lid 92. The spine member then mounts a rest or safetyguard and the top wall 12 can be covered by a smooth panel. Other variations may be provided using the different options for fastening components provided by the moulding 4.

USE

The assembly 42 not only provides a desirable appearance and can be quickly and conveniently located but also provides considerable safety in operation in cooperation with the circuit (see FIGS. 7 and 8). The actuating assembly is normally in the attitude shown in FIG. 7A. The power tool can only be switched ON by first lifting the OFF actuating plate as shown in FIG. 7C requiring deliberate movement and considerably reducing the risk of accidental starting of the power tool. At the same time if the tool has to be switched OFF in an emergency the OFF actuating plate can be located with ease and operated easily as shown in FIG. 7B as the spring force for oprating the associated microswitch is small. Should the tool be cut-off, either by an under-voltage cut-out or as a result of the plug being pulled out of its socket, on re-connection it will not start-up unless the ON actuating plate is pressed as the relay was de-energized by disconnection. No re-set button is required. In view of the safe yet simple switch operation, the moulding and actuating plate assembly can be used for a wide variety of power tools if required.

We claim:

1. Power tool having an electric motor, a component mounting the motor and a drive mechanism for a tool implement characterised in that a box-shaped moulding of synthetic material mounts, apart from a motor and a drive mechanism for an implement, also a switch actuating assembly flush in a side of the moulding, said assembly comprising an OFF actuating plate pivotably mounted in a recess in the side and covering an ON actuating plate to which access can be gained by pivoting the OFF actuating plate upwards.

2. Power tool as claimed in claim 1 further characterised in that the ON actuating plate is of resiliently deformable synthetic material, has a pair of first projections with pins for being resiliently clipped in corresponding holes in side of the OFF actuating plate to pivotably mount that plate, edges for clipping behind the side and lugs for resting on an internally offset side portion to locate the assembly in the moulding.

3. Power tool as claimed in claim 2 further characterised in that the actuating plates each operate a microswitch mounted behind the internally offset side portion and the ON switching microswitch is in a self-holding relay containing circuit and the OFF-switching microswitch de-activates the relay so as to avoid a re-set control.

4. Power tool as claimed in any of the preceding claims further characterised in that the moulding has a second side opposite the first mentioned side, which second side forms a column for locating a structural metal spine member.

5. Power tool as claimed in claim 4 further characterised in that the drive mechanism in the moulding is a bottom pulley and the spine member supports a further moulding for a top guide pulley, the pulleys mounting between them a bandsaw blade one leg of which passes inside the spine member.

6. Power tool as claimed in claim 5 further characterised in that a guard is mounted inside the spine member which guard is movable to permit withdrawal of the blade but is locked in position when lids for the mouldings are secured in position.

7. Power tool as claimed in any of claims 1-6 further characterised in that a top of the moulding is adapted to mount a work top and a bottom is adapted to mount support legs.

* * * * *